(12) United States Patent
Staub

(10) Patent No.: US 6,212,862 B1
(45) Date of Patent: Apr. 10, 2001

(54) METHOD AND APPARATUS FOR DETERMINING AN AREA OF HARVESTED CROP

(75) Inventor: Michael D. Staub, Washington, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/259,020

(22) Filed: Feb. 26, 1999

(51) Int. Cl.[7] .................................................. A01D 75/28
(52) U.S. Cl. ........................... 56/10.2 R; 56/10.2 A; 56/DIG. 15; 460/1
(58) Field of Search ........................... 56/10.2 A, 10.2 R, 56/10.2 D, DIG. 15, DIG. 2, 10.2 C; 37/413, 414, 415; 364/564, 488; 460/1

(56) References Cited

U.S. PATENT DOCUMENTS

| | | | |
|---|---|---|---|
| 5,282,389 | * | 2/1994 | Faivre et al. ........................ 73/861.73 |
| 5,463,854 | * | 11/1995 | Chmielewski, Jr. et al. .... 56/10.2 E |
| 5,542,781 | * | 8/1996 | Yemington et al. .................. 405/128 |
| 5,546,093 | * | 8/1996 | Gudat et al. .......................... 342/357 |
| 5,666,793 | * | 9/1997 | Bottinger ............................ 56/10.2 R |
| 5,960,378 | * | 9/1999 | Watanabe et al. .................... 702/150 |

* cited by examiner

*Primary Examiner*—Robert E. Pezzuto
*Assistant Examiner*—Arpad Fabian Kovacs
(74) *Attorney, Agent, or Firm*—Steve D. Lundquist

(57) ABSTRACT

A method and apparatus for determining an area of crop being harvested by a harvesting machine having a cutter bar of a known total width. The method and apparatus includes a position determining system located on the harvesting machine, and a processor located on the harvesting machine. The processor is adapted to receive position signals from the position determining system and to determine a first position of the harvesting machine, determine a first effective cutter bar width, determine a second position of the harvesting machine, determine a second effective cutter bar width, and responsively determine an area of a polygon bounded by the first and second positions, and the first and second cutter bar widths.

11 Claims, 5 Drawing Sheets

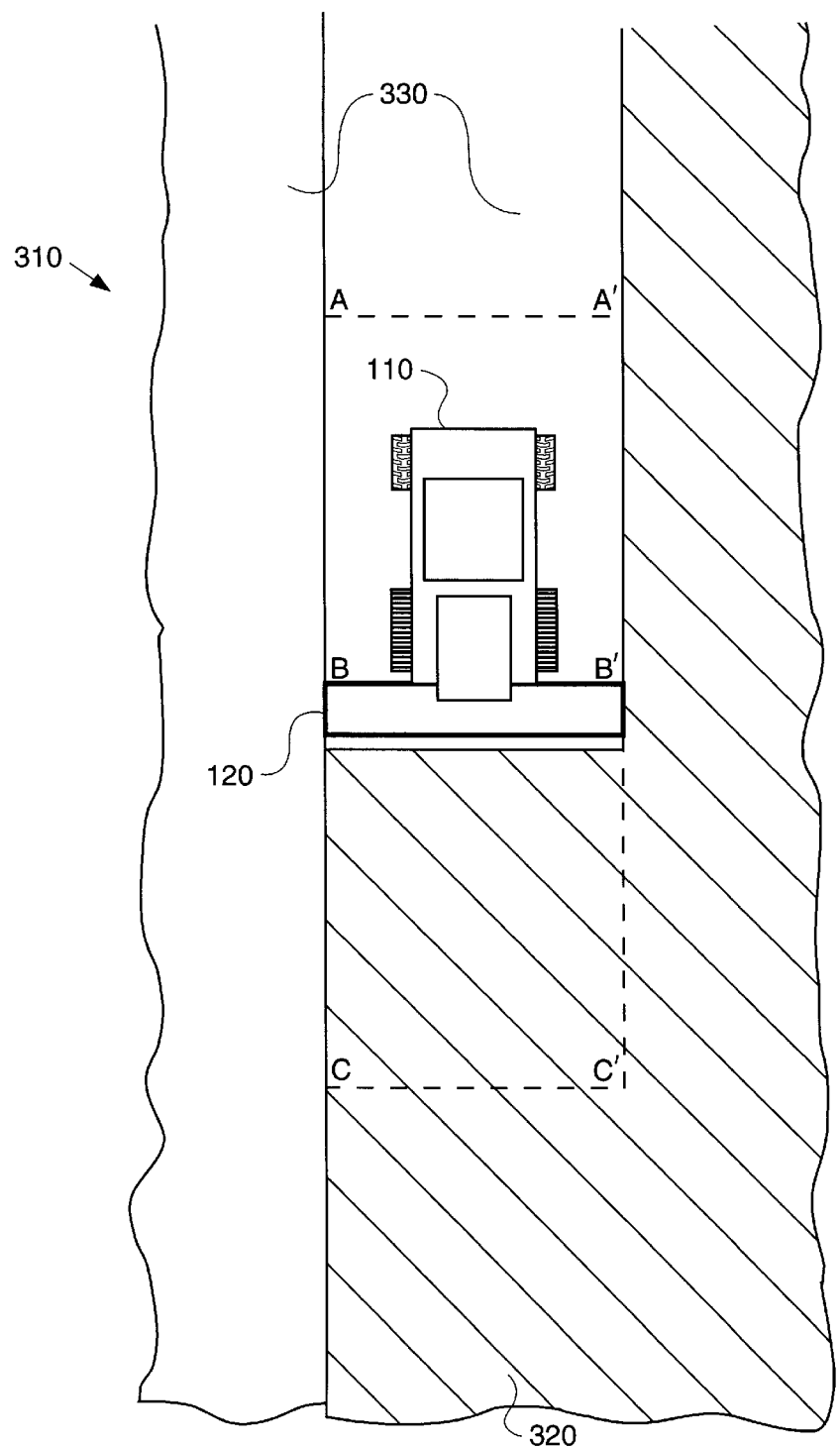

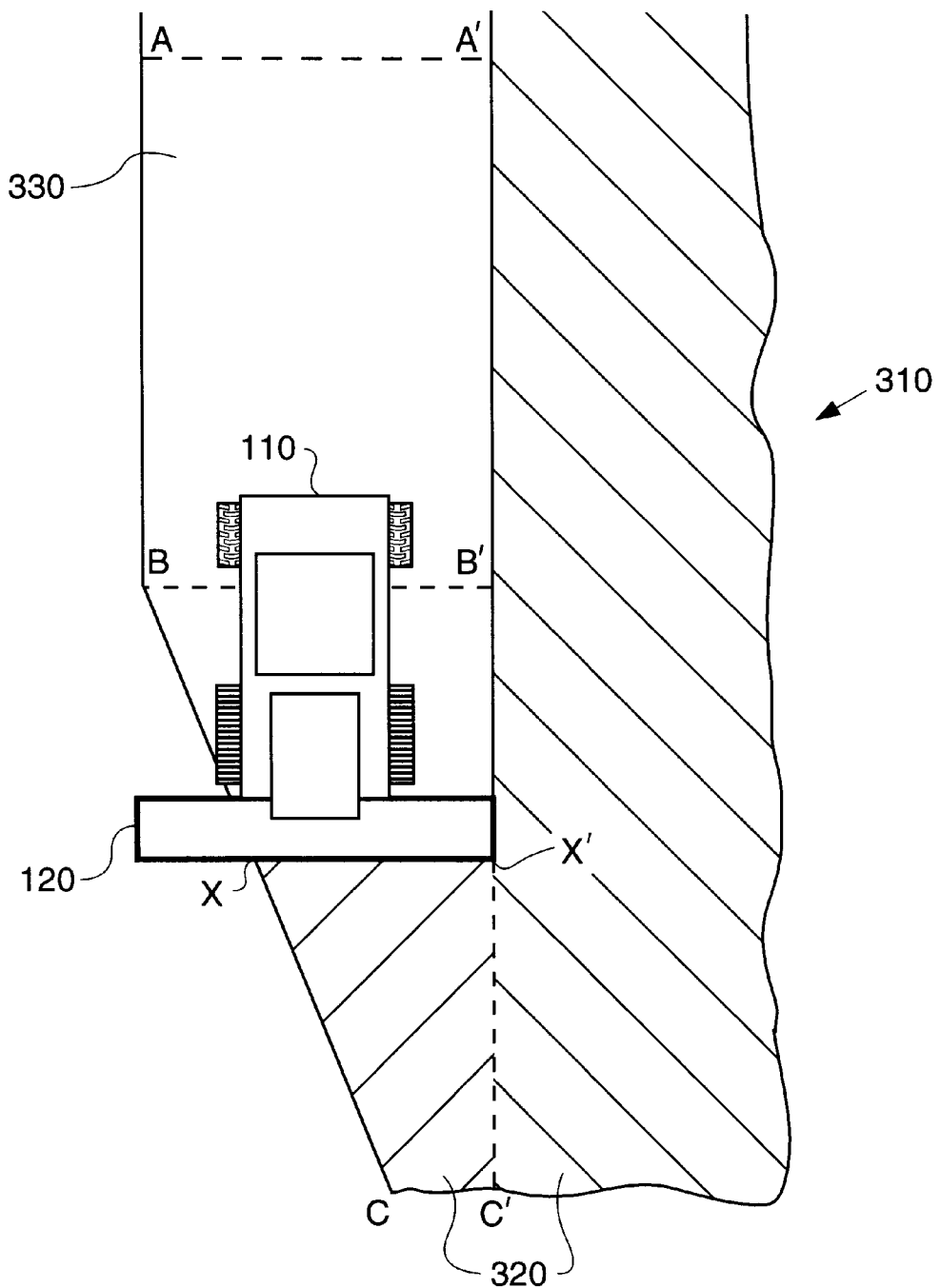
Fig_4

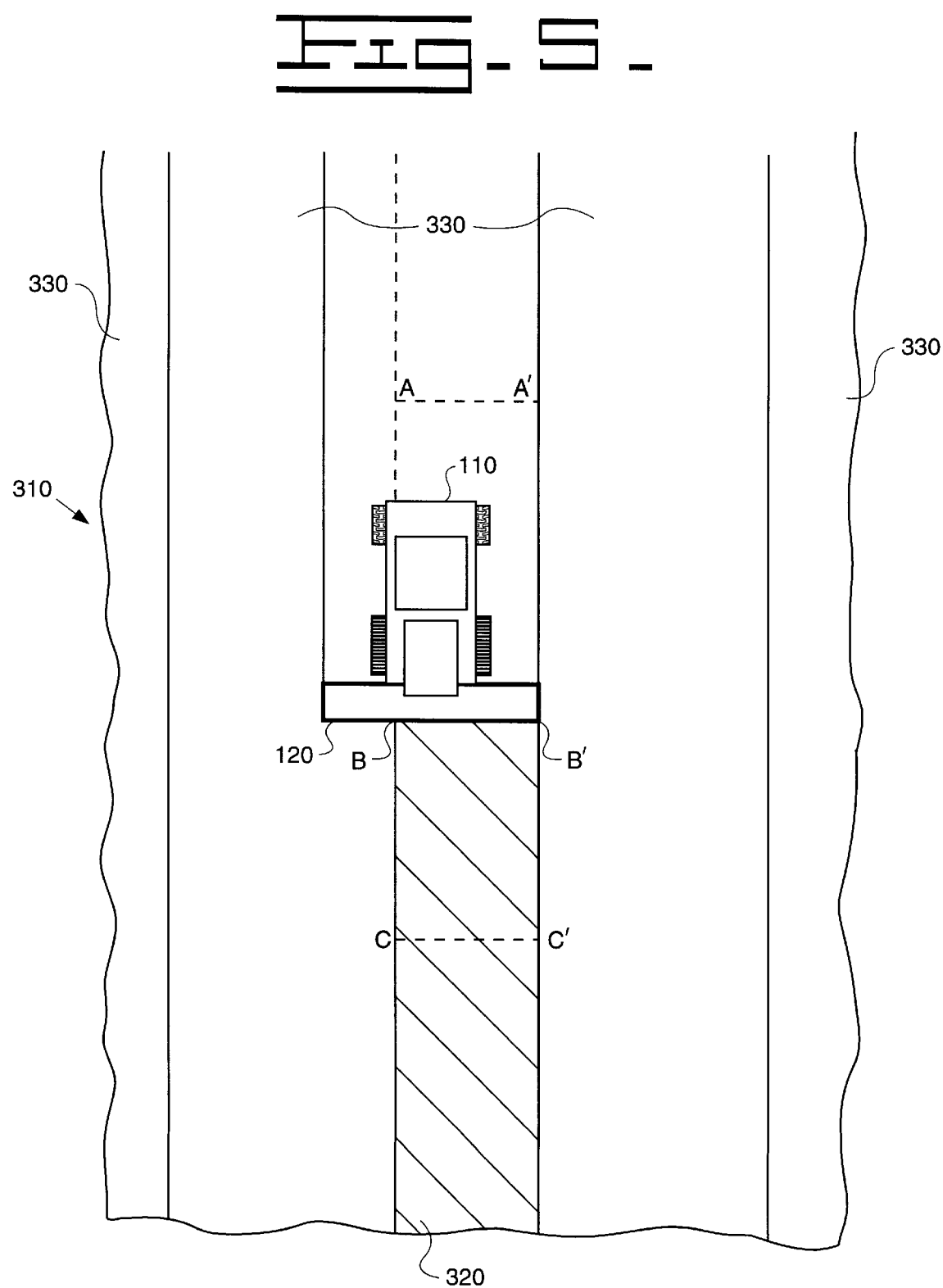

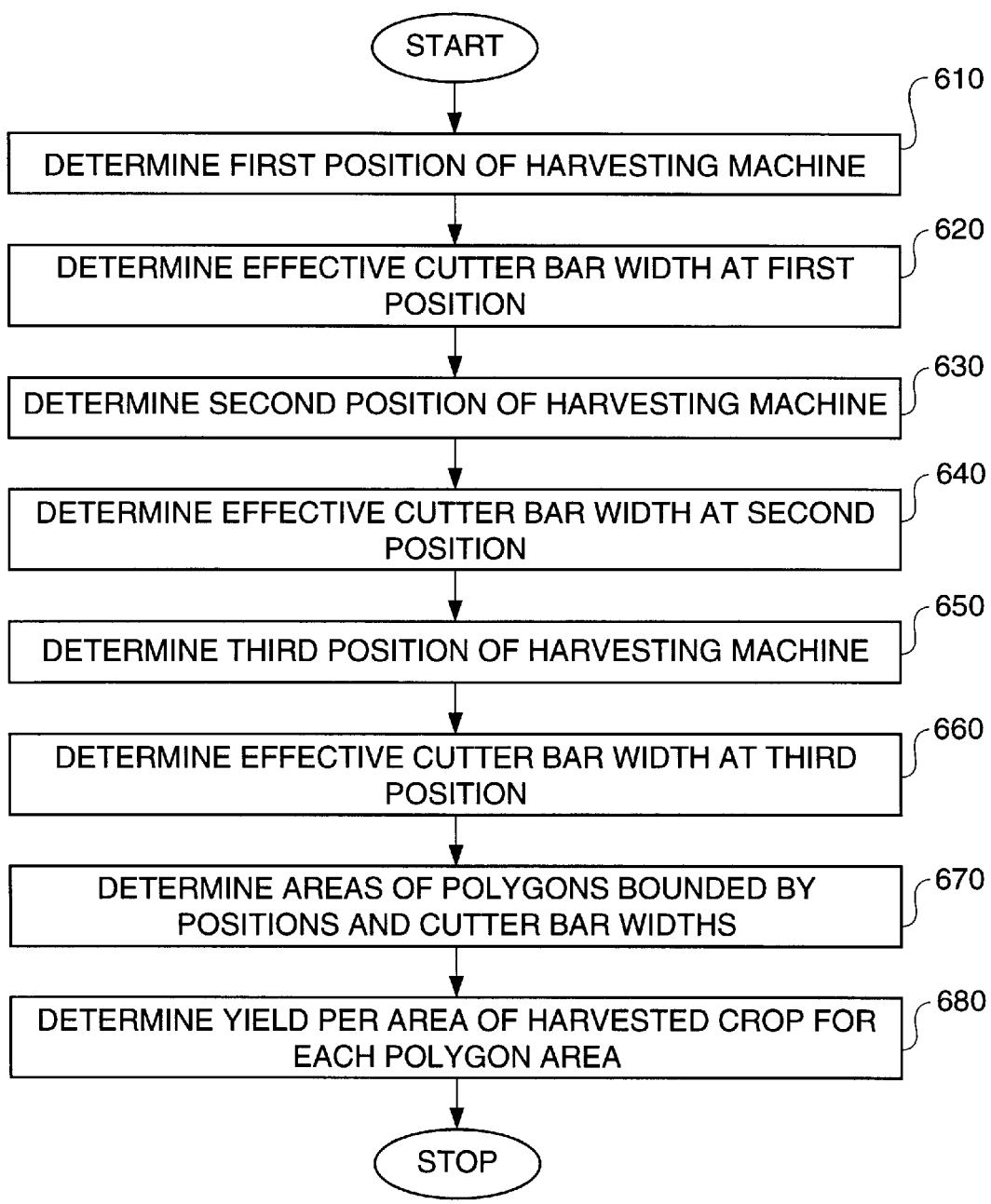

METHOD AND APPARATUS FOR DETERMINING AN AREA OF HARVESTED CROP

TECHNICAL FIELD

This invention relates generally to a method and apparatus for determining an area of harvested crop and, more particularly, to a method and apparatus for determining an area of harvested crop as a function of an effective cutter bar width.

BACKGROUND ART

Precision farming has evolved to address the needs of farmers to achieve optimal results in obtaining a high yield crop efficiently and economically. One aspect of precision farming is known as precision yield mapping. Yield mapping is essential to monitor the amount of yield, i.e., the yield per acre, in an agricultural field. Precision yield mapping enables a farmer to determine areas of the field which require special attention, such as applications of fertilizers and chemicals, which may not be needed in other portions of the field.

Historically, yield per acre has been estimated by dividing the total yield by the number of acres traversed. This gives an average yield for the entire area, but does not determine yield in specific locations of interest. For example, a ten acre plot may yield a quantity of bushels of crop per acre, but the specific yield at any portion of the ten acre plot is not readily determined.

With the advancements made in position determining technology, such as GPS position determining, yield per acre may be determined with respect to the position of a harvesting machine as the crop is harvested. This yield per acre determination may be mapped to a terrain database map to help establish a fairly accurate representation of areas in the field which require special attention due to low yields. However, these determinations are typically performed by multiplying the full width of the cutter bar on the harvesting machine by the distance the machine has traversed, thus determining an area of a rectangle covered by the cutter bar. The accuracy of the yield determinations are compromised in areas where the crop being harvested does not extend for the entire width of the cutter bar, such as around the perimeter of the field or when harvesting a narrow row of crop.

The present invention is directed to overcoming one or more of the problems as set forth above.

DISCLOSURE OF THE INVENTION

In one aspect of the present invention a method for determining an area of crop being harvested by a harvesting machine having a cutter bar of a known total width is disclosed. The method includes the steps of determining a first position of the harvesting machine, determining a first effective cutter bar width, determining a second position of the harvesting machine, determining a second effective cutter bar width, and determining an area of a polygon bounded by the first and second positions, and the first and second effective cutter bar widths.

In another aspect of the present invention an apparatus for determining an area of crop being harvested by a harvesting machine having a cutter bar of a known total width is disclosed. The apparatus includes a position determining system located on the harvesting machine, a terrain map database located on the harvesting machine, and a processor located on the harvesting machine. The processor is adapted to receive position signals from the position determining system and data from the terrain map database, and to determine a first position of the harvesting machine, determine a first effective cutter bar width, determine a second position of the harvesting machine, determine a second effective cutter bar width, and responsively determine an area of a polygon bounded by the first and second positions, and the first and second cutter bar widths.

BRIEF DESCRIPTION OF THE DRAWINGS

FIG. 3 is a diagrammatic illustration of an aspect of the present invention;

FIG. 4 is a diagrammatic illustration of another aspect of the present invention;

FIG. 5 is a diagrammatic illustration of yet another aspect of the present invention; and FIG. 6 is a flow diagram illustrating a preferred method of the present invention.

BEST MODE FOR CARRYING OUT THE INVENTION

Figure 1:
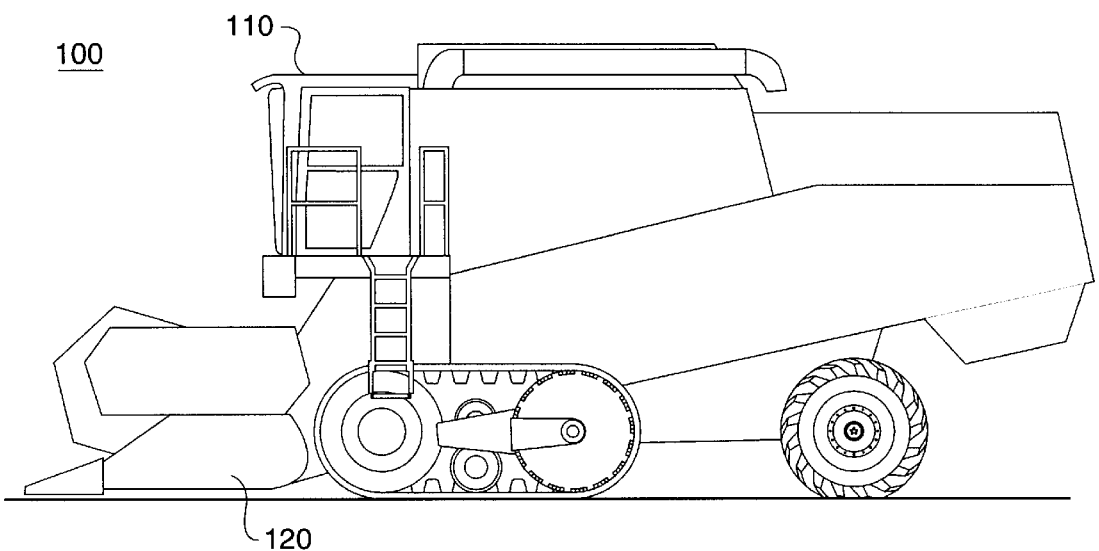
FIG. 1 is a diagrammatic illustration of a harvesting machine suitable for use with the present invention.

With reference to the drawings, a method and apparatus 100 for determining an area of crop being harvested by a harvesting machine having a cutter bar of a known total width is shown. With particular reference to FIG. 1, a harvesting machine 110 suited for use with the present invention is illustrated. The harvesting machine 110 may be a combine, harvester, thresher, or some other type of mobile machine suitable for harvesting crop in a field.

A cutter bar 120, located on the harvesting machine 110, harvests the crop, which is temporarily stored in the harvesting machine 110 until the crop may be transferred elsewhere.

As the crop is harvested, it is normally desired to determine how much crop is gathered on a yield per unit area basis, e.g., yield per acre. This information provides valuable insight into the effectiveness of crop growing techniques, such as the application of fertilizers and chemicals, and the amount of moisture provided by rainfall or irrigation. The information also helps determine specific areas of the field which require special attention, such as precise applications of chemicals in only those areas which require it.

Figure 2:
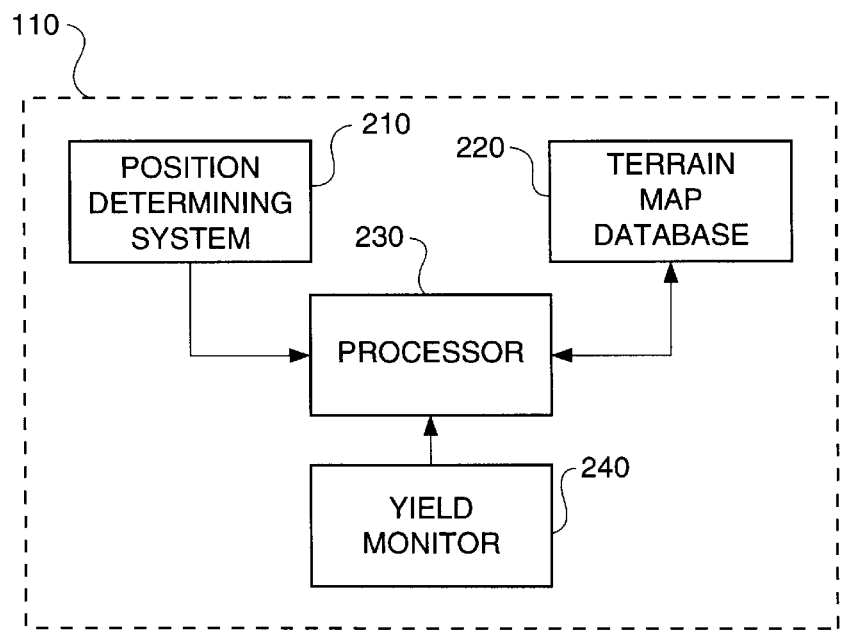
FIG. 2 is a block diagram illustrating a preferred embodiment of the present invention.

Referring now to FIG. 2, a block diagram illustrating a preferred embodiment of the present invention is shown.

A position determining system 210, located on the harvesting machine 110, determines the location of the harvesting machine 110, preferably in geographic coordinates with respect to a field being traversed by the harvesting machine 110. In the preferred embodiment, the position determining system 210 is a GPS based system. However, other position determining systems, e.g., laser plane reference systems, dead reckoning position systems, and the like, may be used as well. It is to be understood that combinations of position determining systems may be used to provide more accurate and reliable position determinations, as is well known in the art.

A processor 230, preferably a computer-based processor, is located on the harvesting machine 110, and is adapted to receive position information from the position determining system 210. The processor is also adapted to receive terrain information from a terrain map database 220, also preferably located on the harvesting machine 110. Operation of the processor 230 with relation to the position determining system 210 and the terrain map database 220 is described in more detail below.

A yield monitor 240, located on the harvesting machine 110, determines an amount of crop that is harvested by the harvesting machine 110. Yield monitors are well known in the art and will not be discussed further.

Referring now to FIG. 3, a diagrammatic illustration of a harvesting machine 110 as depicted in a typical harvesting operation is shown. The harvesting machine 110 is shown traversing a portion of a field 310. The portion of the field 310 that has been traversed by the harvesting machine 110 is the harvested portion 330 of the field 310. The portion of the field 310 that has not been traversed by the harvesting machine 110 is the unharvested portion 320 of the field 310.

In the harvesting operation shown in FIG. 3, the width of crop being harvested is equal to the total width of the cutter bar 120, which is known. As the cutter bar 120 moves from line A–A' to line B–B', a rectangular section of the field 310 is harvested. The yield per area is found easily by dividing the total yield during harvesting of this section by the area of the section, which is the total width of the cutter bar 120 multiplied by the distance from A–A' to B–B'. In like manner, the yield per area for the section from B–B' to C–C' is easily found. Yield per area determinations are found for additional sections throughout the entire field 310. The resolution, i.e. area size, of the sections is controlled by selecting the distance from A–A' to B–B' to C–C', and so forth. At each of these locations, the position is determined by the position determining system 210.

Referring now to FIG. 4, the harvesting machine 110 is shown traversing a portion of the field 310 which has an unharvested portion 320 of a width that is narrower than the total width of the cutter bar 120, e.g., along the perimeter of the field 310. As FIG. 4 illustrates, the section from A–A' to B–B' is as wide as the total width of the cutter bar 120, and the area is easily determined. However, the section from B–B' to C–C' is narrower than the width of the cutter bar 120, and tapers; that is, the shape is not rectangular.

In the present invention, the processor 230 is adapted to receive information from the position determining system 210 and the terrain map database 220 and responsively determine the effective width of the cutter bar 120, shown in FIG. 4 as width X–X'. The determination of the effective width of the cutter bar 120 as the harvesting machine 110 travels allows the processor 230 to determine the exact dimensions of the section of crop being harvested. The processor 230 may then determine the area of the section, preferably using software that is widely available. For example, software may be used which divides the irregular shapes of the section into fundamental geometric shapes. The areas of the fundamental shapes are then easily calculated and summed to determine the area of the section. While the above software approach may be preferred for use in the present invention, other methods for determining the area of irregular shapes may be used instead. For example, the section may be divided into slices or grids of rectangular or square shapes, then the areas of the smaller shapes are computed and summed.

The processor 230 is adapted to store the determined areas of the sections into the terrain map database 220. Preferably, the processor 230 also stores information relevant to the harvested and unharvested portions 330, 320 of the field 310 so that the terrain map database 220 is kept current.

Referring now to FIG. 5, the harvesting machine 110 is shown traversing an unharvested portion 320 of the field 310 which is a strip that is narrower than the total width of the cutter bar 120. This situation may exist as a field is being harvested from two directions, thus resulting in a narrow strip to harvest in the middle. The areas of the sections, e.g., from A–A' to B–B', and from B–B' to C–C', are determined as before by determining the effective width of the cutter bar 120, and responsively determining the areas of the sections.

Referring now to FIG. 6, a flow diagram of a preferred method of the present invention is shown. Discussion of the steps embodied in FIG. 6 is better understood with continued reference to FIGS. 1–5.

In a first control block 610, a first position of the harvesting machine 110 is determined by the position determining system 210. In FIGS. 3–5, this first position corresponds to line segment A–A'.

In a second control block 620, the effective cutter bar width at the first position is determined. In FIGS. 3 and 4, the effective cutter bar width is the total width of the cutter bar 120. However, in FIG. 5, the effective cutter bar width is less than the total cutter bar width. The effective cutter bar width is the width of the strip of crop being harvested, and is determined by reference to the terrain map database 220 relative to the known position of the harvesting machine 110. The terrain map database 220 contains updated information on the location of the unharvested portions 320 of the field 310.

In a third control block 630, a second position of the harvesting machine 110 as it traverses the field 310 is determined. The second position corresponds to line segment B–B', shown in FIGS. 3–5.

Control then proceeds to a fourth control block 640, where the effective cutter bar width at the second position is determined. Again, the effective cutter bar width at position B–B' is the total width of the cutter bar 120 in FIGS. 3 and 4, and is less than the total cutter bar width in FIG. 5.

In a fifth control block 650, a third position of the harvesting machine 110 is determined. The third position corresponds to line segment C–C' in FIGS. 3–5.

In a sixth control block 660, the effective cutter bar width at the third position is determined. Referring specifically to FIG. 4, the effective cutter bar width from B–B' to C–C' is the variable width X–X'. The effective cutter bar width, X–X', is determined by the processor 230 from information received by the position determining system 210 and the terrain map database 220. Subsequently, a polygon defined from line segments B–B' to C–C' is readily determined. In like manner, a polygon defined from line segments A–A' to B–B' is also determined. Similar polygons would be determined in the embodiments illustrated by FIGS. 3 and 5.

The areas of the polygons are determined in a seventh control block 670, preferably using one of the software methods described above. The areas are preferably stored in the terrain map database 220. Control then proceeds to an eighth control block 680, where the yield per area of harvested crop for each polygon is determined.

Although the present invention has been described with respect to three position determinations and two polygons, it is noted that the flowchart of FIG. 6 continually loops, repeating the process until the entire field being harvested is mapped in such a manner. Therefore, the entire field is divided into polygons of a desired size; each polygon having a known area and a determined yield.

INDUSTRIAL APPLICABILITY

The present invention provides a method and apparatus to accurately and efficiently determine the yield per area of a field of crop being harvested in small enough desired increments to allow precision applications of water, chemicals, and fertilizers in only those portions of the field requiring such applications. Increased accuracy is achieved by using position determining and terrain mapping technologies to compensate for those portions of the field where the width of crop being harvested is less than the total width of the cutter bar 120, e.g., around the perimeter of the field, along a center row of narrower width than the cutter bar 120, and along portions of the field where terrain characteristics result in a less than full width of cut by the cutter bar 120.

Other aspects, objects, and features of the present invention can be obtained from a study of the drawings, the disclosure, and the appended claims.

What is claimed is:

1. A computer-based method for determining an area of crop being harvested by a harvesting machine having a cutter bar of a known total width, including the steps of:
    determining a first position of the harvesting machine;
    determining a first effective cutter bar width at the first position;
    determining a second position of the harvesting machine;
    determining a second effective cutter bar width at the second position; and
    determining an area of a polygon bounded by the first and second positions, and the first and second effective cutter bar widths;
    wherein the area of the polygon is determined by:
        dividing the polygon into areas having fundamental geometric shapes;
        calculating the area of each fundamental shape; and
        summing the areas of the fundamental shapes.

2. A method, as set forth in claim 1, further including:
    determining a third position of the harvesting machine;
    determining a third effective cutter bar width at the third position; and
    determining an area of a polygon bounded by the second and third positions, and the second and third effective cutter bar widths.

3. A method, as set forth in claim 2, further including storing the areas of the determined polygons in a terrain map database.

4. A method, as set forth in claim 3, further including the step of determining a yield per area of harvested crop for each determined polygon area.

5. A method, as set forth in claim 3, wherein the effective width of the cutter bar is determined by determining a width of crop being harvested at the cutter bar.

6. A method, as set forth in claim 5, wherein the width of the crop being harvested is determined from the terrain map database, the terrain map database being dynamically updated as the harvesting machine harvests the crop.

7. A method, as set forth in claim 2, wherein the distance from the first position to the second position and from the second position to the third position is determined as a function of the distance the harvesting machine travels between subsequent position determinations and of a desired size of the areas of the polygons.

8. An apparatus for determining an area of crop being harvested by a harvesting machine having a cutter bar of a known total width, comprising:
    a position determining system located on the harvesting machine;
    a terrain map database located on the harvesting machine; and
    a processor located on the harvesting machine, the processor being adapted to receive position signals from the position determining system and data from the terrain map database, and to:
    determine a first position of the harvesting machine;
    determine a first effective cutter bar width at the first position;
    determine a second position of the harvesting machine;
    determine a second effective cutter bar width at the second position; and
    responsively determine an area of a polygon bounded by the first and second positions, and the first and second cutter bar widths;
    wherein, to determine the area of the polygon, the processor is further adapted to:
        divide the polygon into areas having fundamental geometric shapes;
        calculate the area of each fundamental shape; and
        sum the areas of the fundamental shapes.

9. An apparatus, as set forth in claim 8, wherein the processor is further adapted to:
    determine a third position of the harvesting machine;
    determine a third effective cutter bar width at the third position; and
    responsively determine an area of a polygon bounded by the second and third positions, and the second and third effective cutter bar widths.

10. An apparatus, as set forth in claim 9, wherein the processor is adapted to store the areas of the determined polygons in the terrain map database.

11. An apparatus, as set forth in claim 10, further including a yield monitor located on the harvesting machine, wherein the processor is further adapted to determine a yield per area of harvested crop for each determined polygon area.

* * * * *